United States Patent
Lapointe

(10) Patent No.: US 8,082,960 B2
(45) Date of Patent: Dec. 27, 2011

(54) AUTOMATIC FLOOR BOARD CLASSIFICATION METHOD AND SYSTEM THEREFOR

(75) Inventor: Andre Lapointe, Saint-Simon-les-Mines (CA)

(73) Assignee: OSI Machinerie, Quebec (CA)

( * ) Notice: Subject to any disclaimer, the term of this patent is extended or adjusted under 35 U.S.C. 154(b) by 459 days.

(21) Appl. No.: 11/712,621

(22) Filed: Mar. 1, 2007

(65) Prior Publication Data

US 2008/0210339 A1    Sep. 4, 2008

(51) Int. Cl.
*B23Q 15/00* (2006.01)
(52) U.S. Cl. .................. 144/403; 209/518; 144/357
(58) Field of Classification Search .................. 144/356, 144/357; 209/517, 518, 521
See application file for complete search history.

(56) References Cited

U.S. PATENT DOCUMENTS

| | | | |
|---|---|---|---|
| 4,660,752 A * | 4/1987 | Rikard et al. | 226/95 |
| 6,510,364 B2 | 1/2003 | Ahrens | |
| 6,598,747 B1 * | 7/2003 | Ahrens | 209/518 |
| 2004/0025654 A1 * | 2/2004 | Olsen | 83/13 |

* cited by examiner

*Primary Examiner* — Dana Ross
*Assistant Examiner* — Matthew G Katcoff
(74) *Attorney, Agent, or Firm* — Wells St. John P.S.

(57) ABSTRACT

A method and a system for classifying a plurality of random length boards of random grade, using a conveyer provided with reading units to read both the length and the grade of each board at a first end of said conveyer; a processor, receiving length and grade data from the reading units; calculating combinations of board lengths and grades and selecting a preferred combination of boards from the combinations; and a distribution section, located at a second end of the conveyer, and operated by the processor according to the preferred combination; the processor being fed with a large number of identified boards, from which to calculate the combinations of board lengths and grades, before they reach the distribution section.

1 Claim, 4 Drawing Sheets

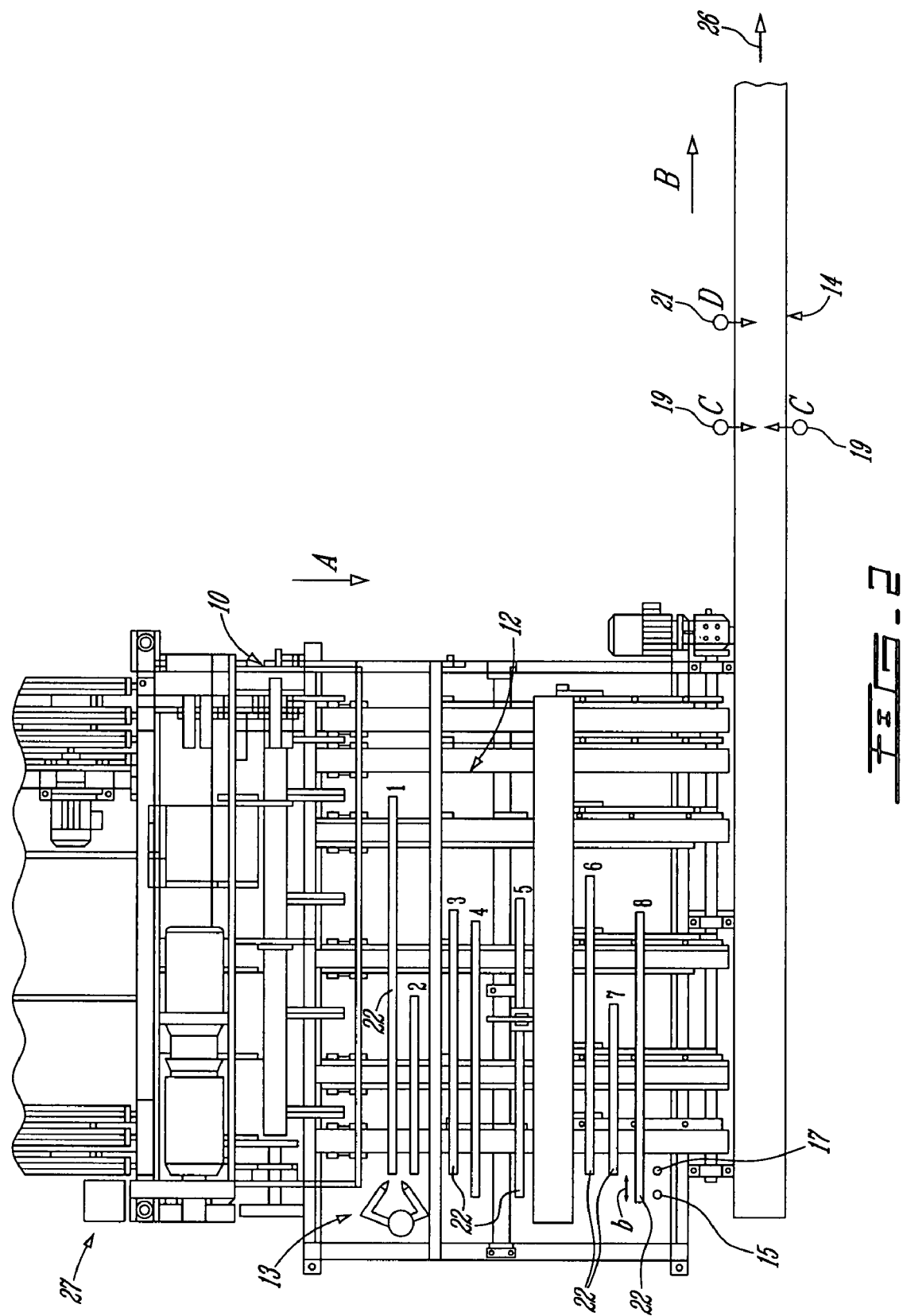

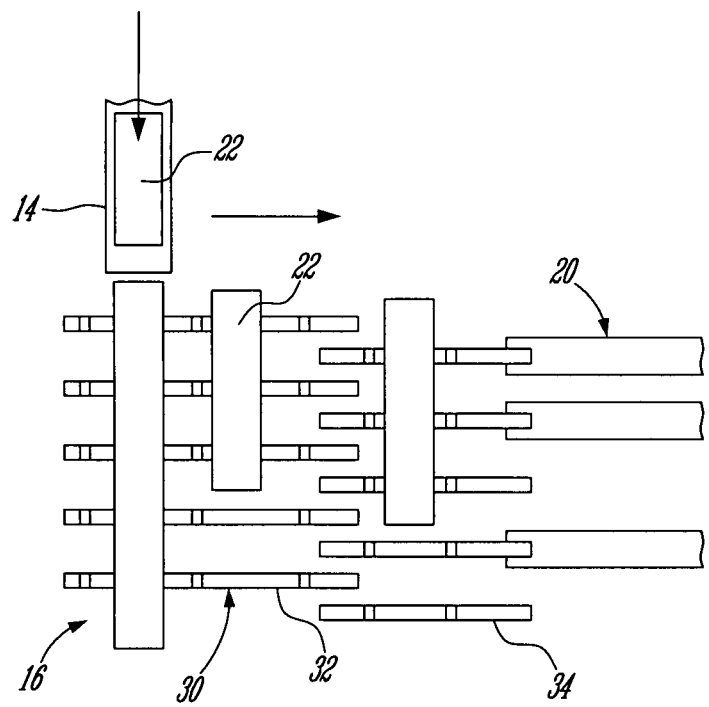
FIG_3A
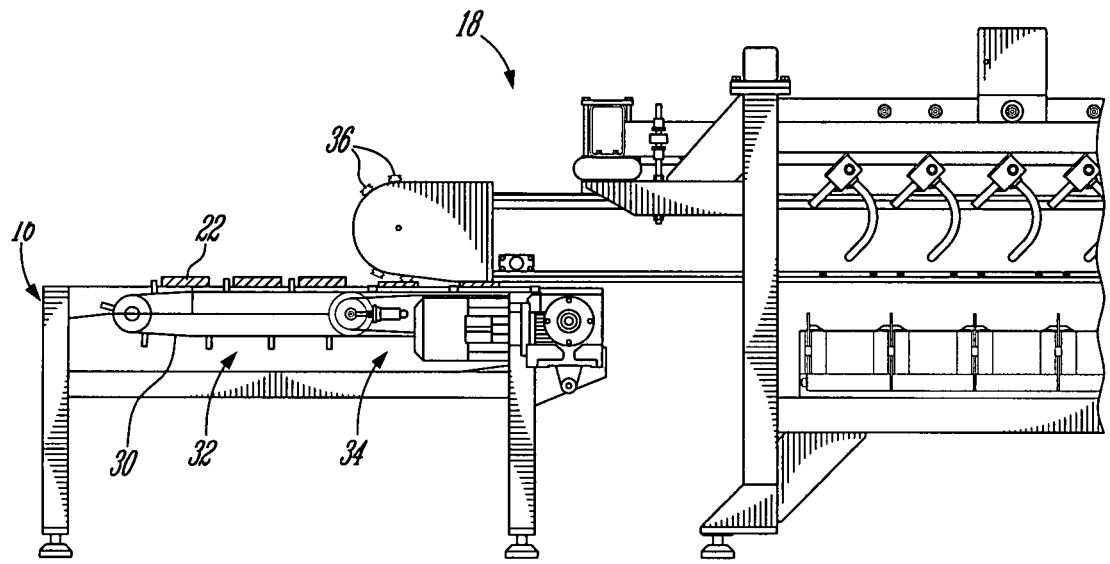
FIG_3B

AUTOMATIC FLOOR BOARD CLASSIFICATION METHOD AND SYSTEM THEREFOR

FIELD OF THE INVENTION

The present invention relates to wood grading. More specifically, the present invention is concerned with automatic floorboard classification and bundling method and system therefor.

BACKGROUND OF THE INVENTION

In a conventional wood floor manufacturing line, boards processed by a tenoner are conveyed to manual sorting stations where operators form bundles, by arranging the boards in rows according to their grade. The floorboards to sort typically have a length in a range between 10 and 84 inches, in as many grades as determined by the producer according to the species.

Since bundles of floorboards are sold in units representing a surface (square foot), efforts are made to at least ensure a target surface in each bundle. However, since only the target surface is billed, it is important not to oversize the bundle. For that purpose, flexibility of the bundling system and method is needed.

U.S. Pat. No. 6,510,364 for example describes a method for selecting random length boards for nesting in a single row of predetermined lengths, including first arranging the boards on an accumulating rack, then conveying the boards to channels in an adjacent storage rack. As the boards are conveyed from the accumulating rack to the storage rack, their length is determined for transmission to a central processor. The processor calculates combinations of board lengths in the storage rack, which will form a single stock row having a combined board length within a predetermined target range. The processor then selects a preferred combination of boards from the possible combinations, and activates gates in the channels to drop the boards to a conveyor and move the selected boards to a stock row accumulating location. The processor then activates gates on the accumulating rack tracks to convey additional boards to empty channels in the storage rack, and repeats the process.

There is still in the art a need for an automatic floorboard classification method and a system therefor.

SUMMARY OF THE INVENTION

More specifically, there is provided a system for classifying a plurality of random length boards of random grade, comprising a conveyer provided with reading units to read both the length and the grade of each board at a first end of the conveyer; a processor receiving length and grade data from the reading units, calculating combinations of board lengths and grades and selecting a preferred combination of boards from the combinations; and a distribution section, located at a second end of the conveyer, and operated by the processor according to the preferred combination, wherein the processor is fed with a large number of identified boards, from which to calculate the combinations of board lengths and grades, before they reach the distribution section.

There is further provided a method of classifying a plurality of random length boards of random grade from a finishing station to a distribution station, comprising the steps of a) determining the grade of each board; b) determining the length of each board; c) conveying the boards from the finishing station to the distribution unit on a conveyer, reading both the grade and the length of each board at a first end of the conveyer for calculating combinations of board lengths and grades and selecting a preferred combination; and d) operating the distribution unit, at a second end of the conveyer, according to the preferred combination.

Other objects, advantages and features of the present invention will become more apparent upon reading of the following non-restrictive description of embodiments thereof, given by way of example only with reference to the accompanying drawings.

BRIEF DESCRIPTION OF THE DRAWINGS

In the appended drawings:

FIG. 2 is a close up view of the region of a reading station in the system of FIG. 1;

FIG. 3 is a) a top view b) a side view of the region of an ejection station in the system of FIG. 1.

DESCRIPTION OF EMBODIMENTS OF THE INVENTION

Figure 1:
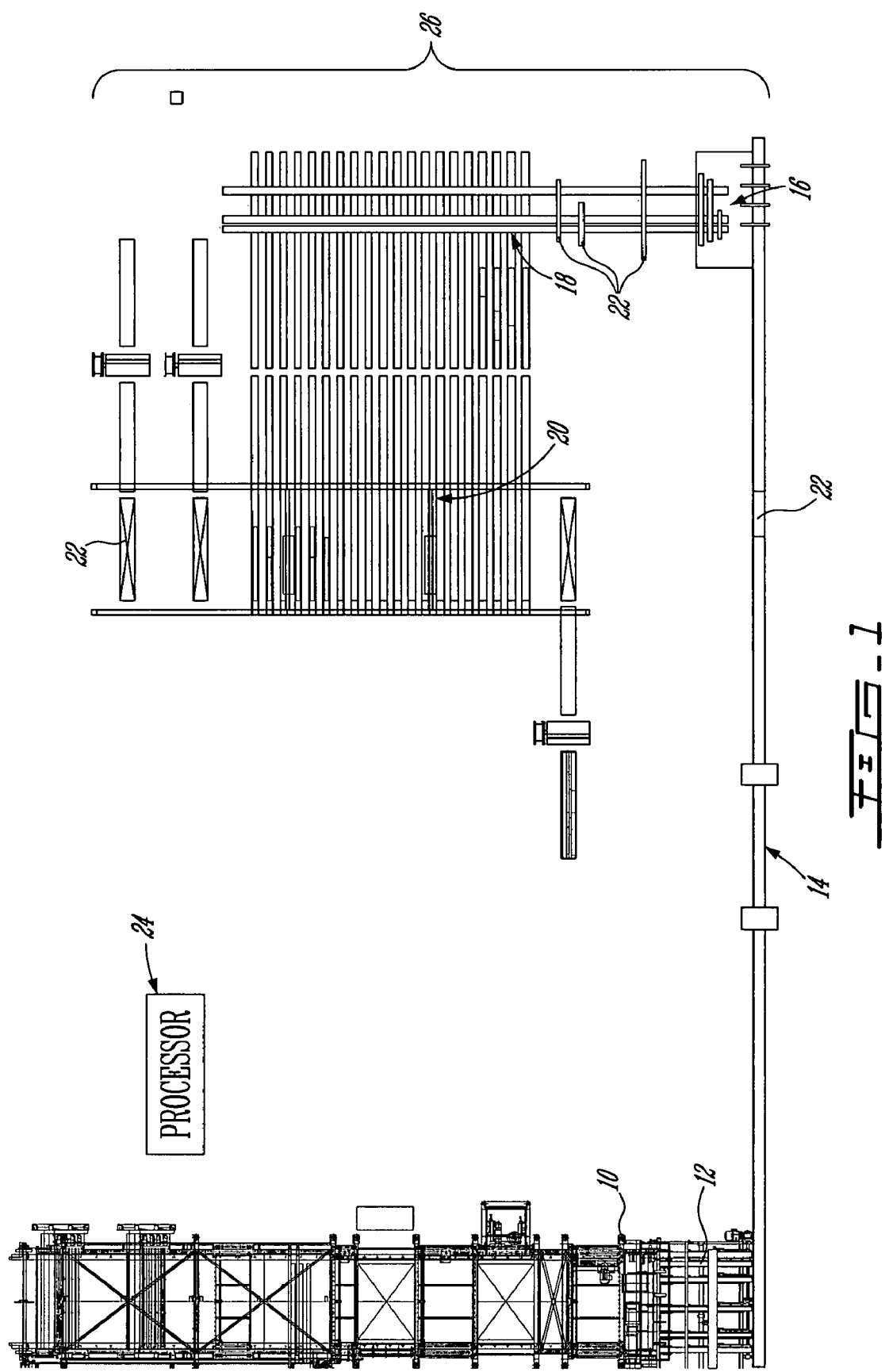
FIG. 1 is a layout of a system according to an embodiment of a aspect of the present invention.

As shown in the layout of FIG. 1, a classification system according to an embodiment of an aspect of the present invention generally comprises a reading station 14 and a distribution station 26.

The distribution station 26 typically comprises a vacuum belt feeder 18 and row-ordering conveyers 20.

A central processor 24 communicates with the reading station 14 and the distribution station 26 to automatically operate the system. The processor calculates combinations of board lengths and grades to form rows, for example, of boards of a given grade to yield a combined board length, and selects a preferred combination of boards from the possible combinations.

FIG. 2 is a close up view of the region of the reading station 14 at the output of a finishing machine, such as a tenoning machine 10.

When they exit the tenoning machine 10, the boards 22-1 to 22-8 as illustrated in FIG. 2 for example, are aligned, a small extremity thereof facing an operator 13 as they are conveyed transversally by the output conveyer 12 of the tenoning machine 10 (see arrow A).

The operator 13 is then able to sort out the boards 22 by their grade, by pulling out the boards of a grade different from a target grade along a distance (b). In the illustration of FIG. 2, the boards 22-4, 22-5 and 22-8 have thus been sorted out.

Before leaving the output conveyer 12 of the tenoning machine 10, the boards pass before sensors 15 and 17, the sensor 15 being distances away from the sensor 17 so as to detect only the boards that have been pulled out by the operator over the distance (b), such as, here for example, boards 22-4, 22-5 and 22-8. Boards activating only the sensor 17 are identified as of the target grade, whereas boards that both sensors 15 and 17 detect correspond to those boards that have been previously pulled out by the operator 13, here for example, boards 22-4, 22-5 and 22-8, and are therefore identified as belonging to a distinct grade.

Obviously, the number of sensors may be increased, corresponding to an associated number of distances over which the boards are pulled out by the operator, to sort out a corresponding number of different grades.

Alternatively, a scanner 27 is used instead of the operator 13 to determine the grade of the boards 22. In this case, a code, such as a bar code for example, containing the grade information is affixed on each board after scanning. The same scanner 27, located before the tenoning machine 10, typically used to locate defaults to be corrected by the tenoning machine 10, may be used to determine the grade of the boards, before they enter the tenoning machine 10, for example.

Then the boards are passed over to the reading station 14.

The reading station 14 is typically a conveyer, conveying the boards longitudinally (arrow B, FIG. 2). It comprises sensors 19, such as a length-measuring sensor that reads each board along a length thereof. The sensors 19 allow recording the length of each board, as well in known in the art In the case when the grade was identified by an operator as described hereinabove, the grade may be recorded as soon as the location of the sensors 15 and 17. In the case when the grade was read using a scanner, as described hereinbefore, a code reader 21 may be used from the location of this scanner on, to read the code containing the grade information as the boards are conveyed on the conveyer 14 towards the distribution station 26 (arrow B).

In any case, at this point, each board is fully identified, both by its grade and length, and the data are transmitted to the central processor 24.

The boards may be fed from the reading station 14 to the vacuum belt feeder 18 of the distribution station 26 by an ejection station 16.

As best seen in the close-up views of FIG. 3, as they reach the ejection station 16, the boards are taken over transversally on endless chains with cleats 30 (see FIG. 3b). More precisely, a first series of cleats 32 receive the boards as they come and transmit them over to a second series of cleats 34, which is synchronized with suction heads 36 of the vacuum belt feeder 18, in a continuous flow.

The central processor 24, already knowing the length and the grade of each incoming board at this point, may identify the suction head 36 collecting a given board 22 so as to monitor its displacement and make the suction head drop the board in the adequate one of the row-ordering conveyers 20 of FIG. 1.

The vacuum belt feeder 18 may be a synchronised vacuum belt feeder as described in copending patent application U.S. Ser. No. 11/271,547, incorporated therein by reference. It is used to distribute the boards to one of the plurality of row ordering conveyers 20.

The row-ordering conveyers 20 typically distribute the boards into rows.

Figure 4:
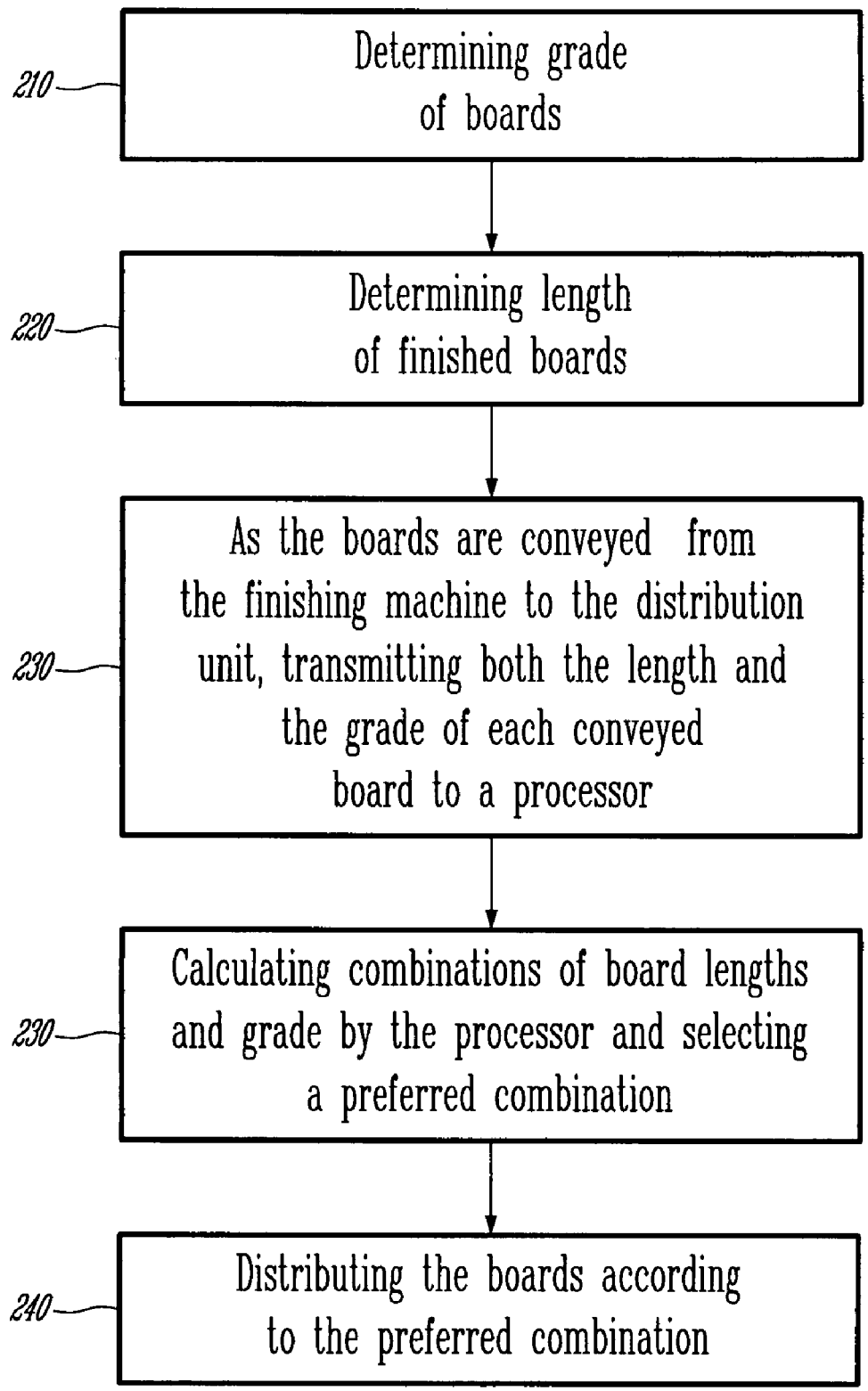
FIG. 4 is a flowchart of a method according to an embodiment of a further aspect of the present invention.

A method for classification of wood boards, of constant or variable length, of a same grade for any given species of wood, according to an embodiment of a further aspect of the present invention will now be described in relation to the flowchart of FIG. 4.

The boards to sort typically have a length in a range between 10 and 84 inches, although they made have any length, in as many grades as determined by the producer according to the wood species.

The method comprises recording and processing both the length and the grade of the boards at an early stage of the process.

Provided a plurality of random length boards of random grade, their grade is determined (step 210), and, after exiting the finishing machine that fixes their length, the length of each board is determined (step 220); as the boards are conveyed from the finishing machine to a distribution station both the length and the grade of each conveyed board is recorded and transmitted to a processor (step 230) for calculating combinations of board lengths and grades and selecting a preferred combination of boards from the combinations (step 240); and the distribution station is then operated according to the preferred combination (Step 250).

Once cut out and milled, the boards exit tenoning machine 10 through an output conveyer 12.

Step 210 may be performed at a number of stages, depending of the installation and available means. For example, their grade may be determined by the same scanner used to determine the remaining defaults to be dealt with by the finishing machine, before entering the finishing machine 10 as described hereinbefore, and each board gets a code containing the grade information on a side thereof. Alternatively, an operator sorts out the boards by grade as they exit the finishing machine 10, as described hereinabove for example.

Step 220 may be performed as soon as the length of the boards is definite, i.e. generally from the exit of the finishing machine on. It may be convenient to have the length of each board measured as they are being conveyed to the distribution station 26.

For example, the length may be detected for each conveyed board as they are conveyed on a conveyer of the reading unit 14, equipped with length sensors as well known in the art.

In any case, step 230 is performed early as the boards are conveyed to the distribution station 26.

They are finally they are fed to the vacuum belt feeder 18 according to both the length and grade thereof (step 250).

The boards are ejected transversally so as to be received centrally (along a length thereof) on suction heads of the vacuum belt feeder 18, for increase stability, as they are conveyed in essentially horizontal equilibrium. The vacuum belt feeder 18 thus takes over the boards, for a continuous and fast distribution thereof to row ordering conveyers 20. More than 300 linear feet of wood may be processed per minute by this type of vacuum belt feeder 18, the boards never being stopped on their way to the row-ordering conveyers 20.

Since the length and the grade are both determined at an early stage of the classification method, the central processor is fed with a large number of identified boards, from which to calculate combinations of board lengths and grades, well before they reach the row-ordering conveyers 20. The combination output of the processor is thus highly improved, resulting in correspondingly more effective solutions to arrange boards together into rows corresponding to bundles matching very closely a target surface. As a result, non-billable surface is reduced in each bundle.

Once the rows are completed, they are picked up by a vacuum system of the row-ordering conveyers 20 and conveyed to stacking and packaging stations 22 for example, where bundles of typically about 20 square feet, or any adequate surface are formed and secured.

People in the art will appreciate that the grade and the length of each board are recorded for transmission to the processor as early as possible. The length may be determined and recorded from the point where the length of the board is fixed, generally from the time they exit the tenoning machine on, using length determining techniques and tools such as optical motion sensors as known in the art. The grade may be determined any time before or after the tenoning machine, manually or with a scanner as described hereinabove. Both the length and the grade information are gathered and sent to the processor at an early stage, for an improved combination output and consequently, an optimized classification and bundling of the boards.

In the example described hereinabove, for example, there is a distance of about 80 feet between the tenoning machine and the ejection unit of the distribution station, i.e. roughly the length of the conveyor 14, for a distance of 15 feet between the ejection unit and the first row-ordering conveyer. There are in average 25 boards on the conveyor 14, and about 30 of them on their way to the first row-ordering conveyer, since at this point, they are conveyed side to side. Therefore, there are about 50 boards identified at each time for calculating combinations.

Obviously the precision of the present invention varies with the distribution of the lengths of the boards to be classified. However, the classification is optimized.

As people in the art will appreciate, the present method allows a continuous flow of boards for an optimized sorting thereof in regards to both length and grade, thereby yielding optimized classification.

Although the present invention has been described hereinabove by way of embodiments thereof, it may be modified, without departing from the nature and teachings of the subject invention as defined in the appended claims.

What is claimed is:

1. A system for forming bundles of floorboards of a given grade, each bundle having a predetermined total surface area, from a plurality of random length boards of random grade, each bundle comprising boards of different lengths and a given grade, the system comprising:

a conveyer provided with a scanner to read both the length and the grade of each board at a first end of said conveyer, each board having a length extending between terminal ends, the length substantially parallel with the grain of the board, and the terminal ends substantially normal to the length;

a processor, receiving length and grade data from said scanner, calculating combinations of boards of a same grade and of different lengths, and selecting, for each bundle to be formed, a combination of boards of a same grade and differing lengths from the combinations to yield the predetermined total surface area of the bundle to be formed;

a distribution section, located at a second end of said conveyer, and operated by said processor according to the selected combinations, the distribution section comprising a vacuum belt feeder, row ordering conveyors and endless chains with cleats; and wherein said endless chains with cleats taking over the boards from the reading station, said endless chains with cleats being synchronized with suction heads of the vacuum belt feeder; and wherein, said processor is fed with a large number of identified boards, from which to calculate and select the combinations of boards of a same grade and different lengths, and said processor operates to distribute individual boards along individual rows, at least some of the boards aligned having abutting terminal ends, said distribution section conveying the rows of boards into bundles of the corresponding grade and predetermined total surface area.

\* \* \* \* \*